Sept. 21, 1943.  R. BOLTON  2,329,690
NEGATIVE POSITIONER FOR ENLARGING PRINTERS
Filed Oct. 19, 1940  4 Sheets-Sheet 1
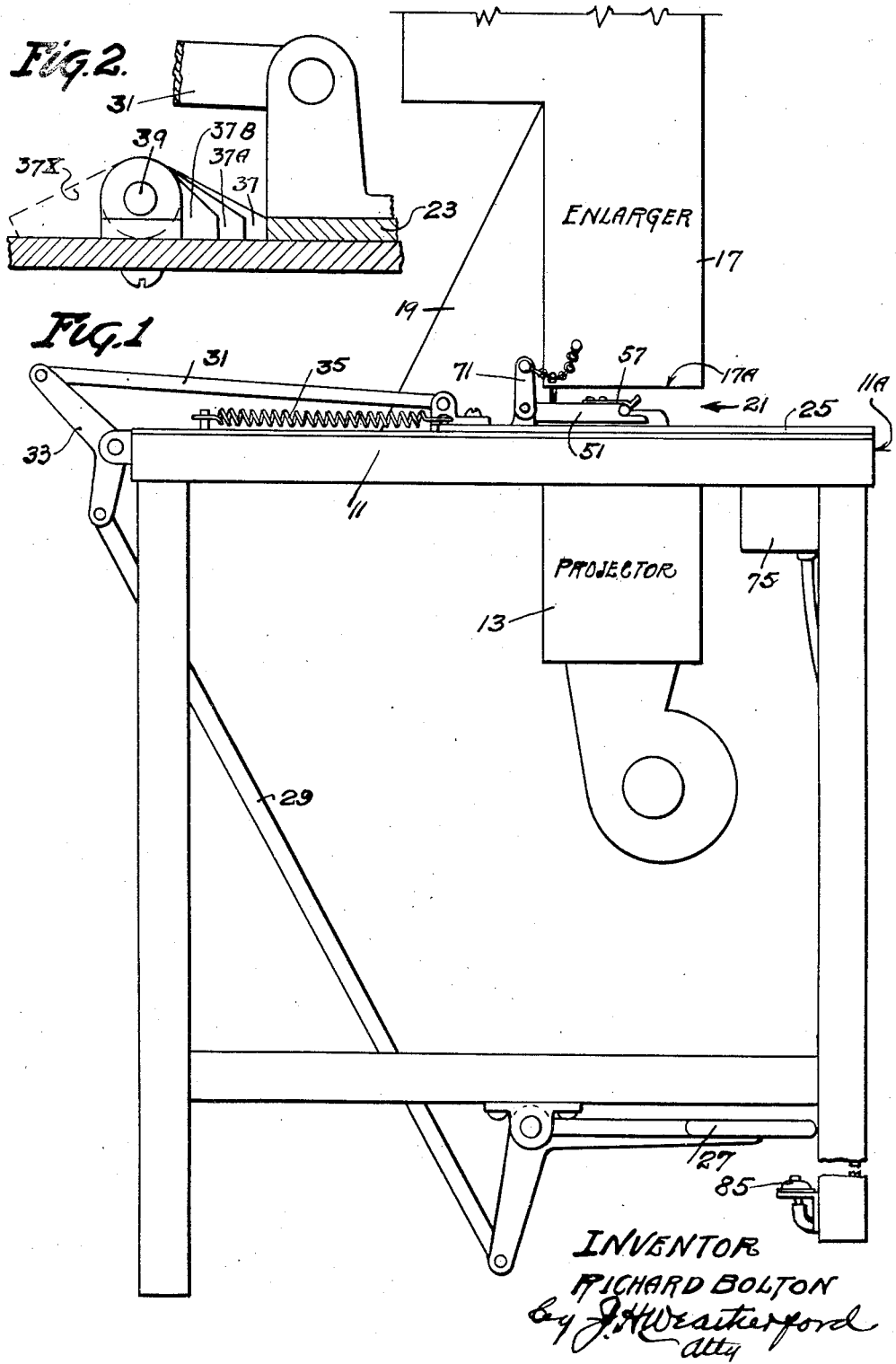
INVENTOR.
RICHARD BOLTON
by J. H. Weatherford
Atty

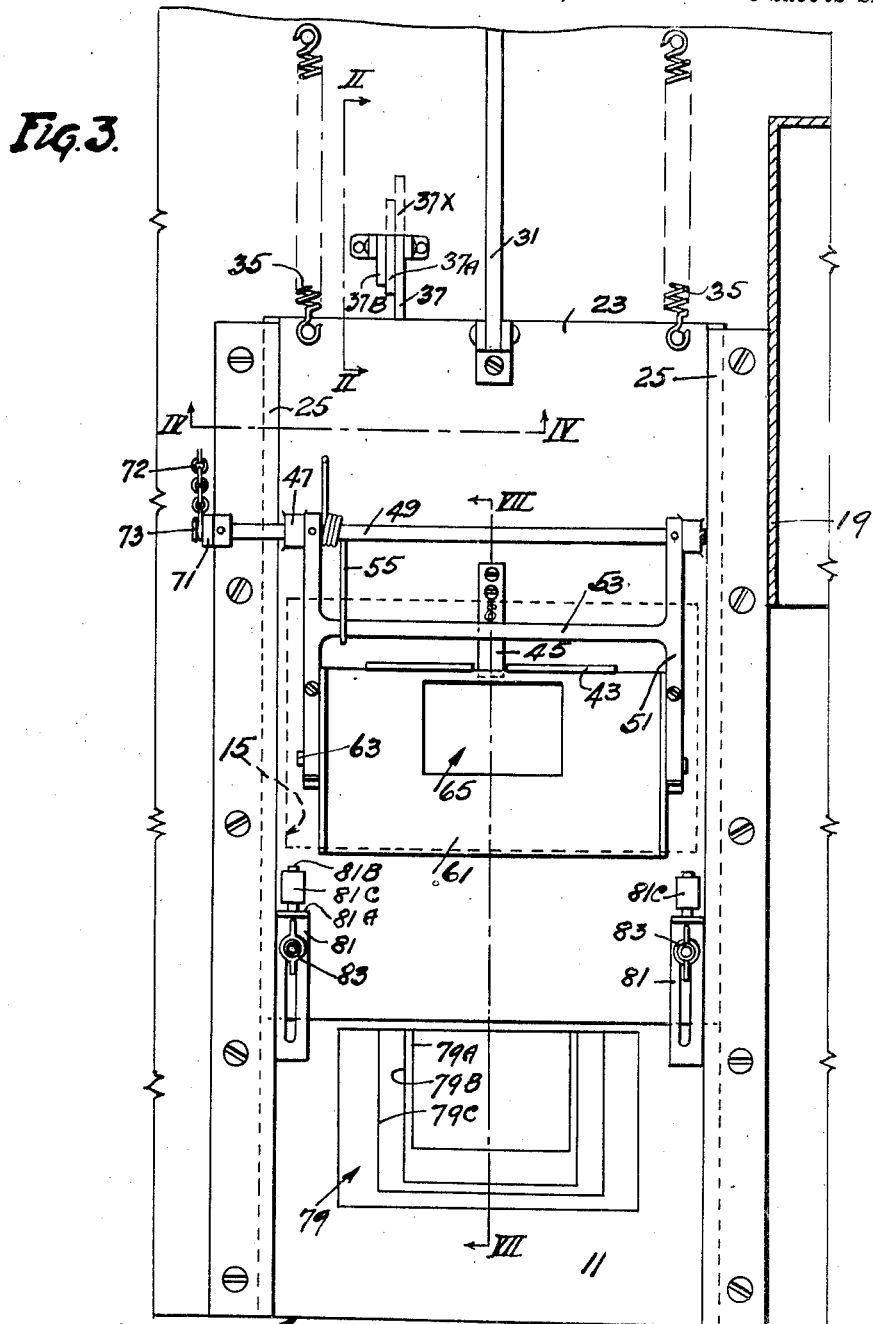
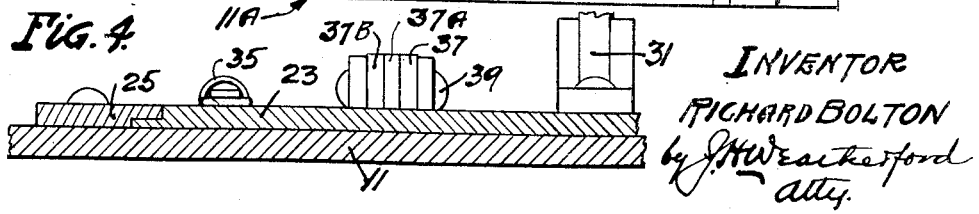

Sept. 21, 1943.　　　　R. BOLTON　　　　2,329,690
NEGATIVE POSITIONER FOR ENLARGING PRINTERS
Filed Oct. 19, 1940　　　4 Sheets-Sheet 3
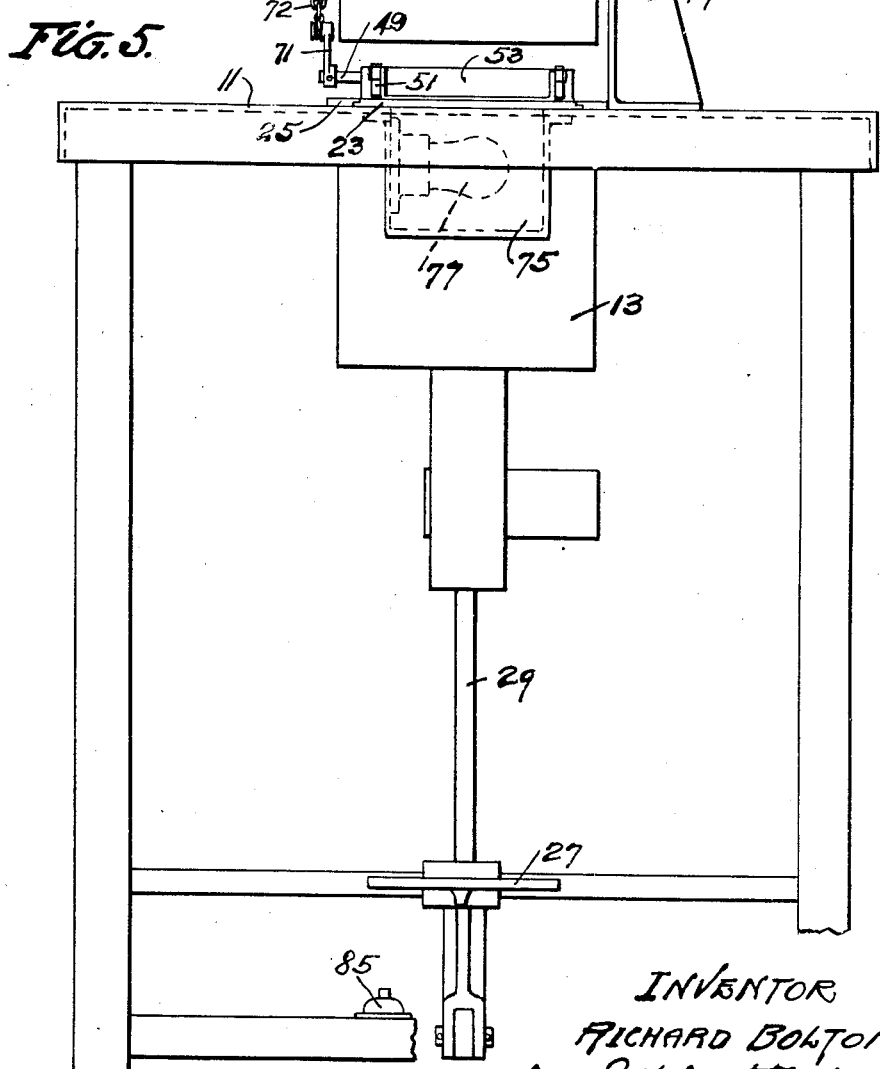
INVENTOR
RICHARD BOLTON
by J. H. Weatherford
atty

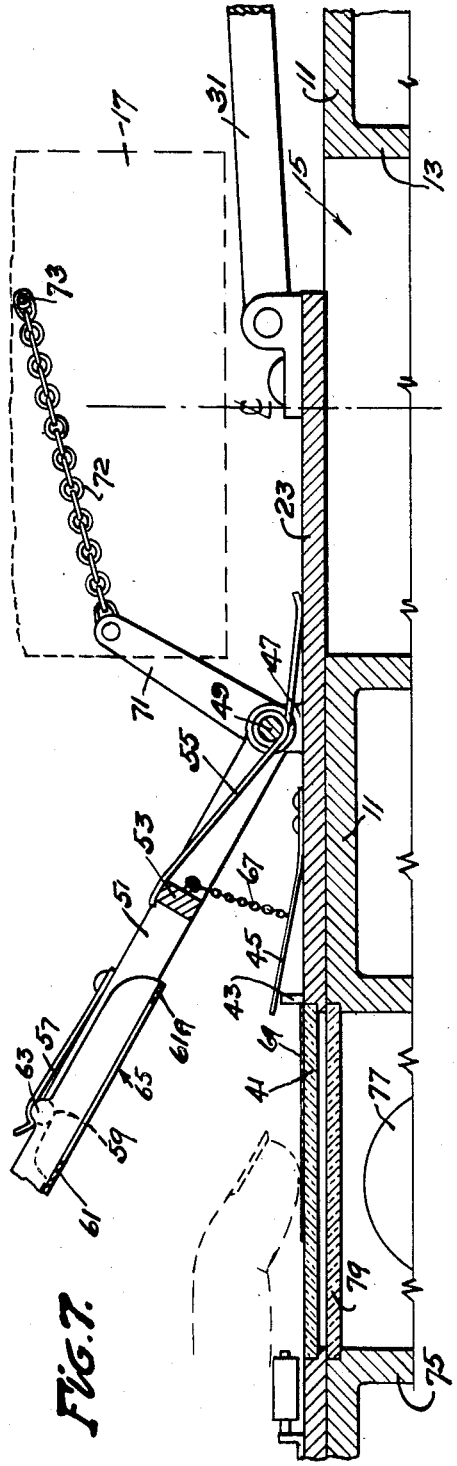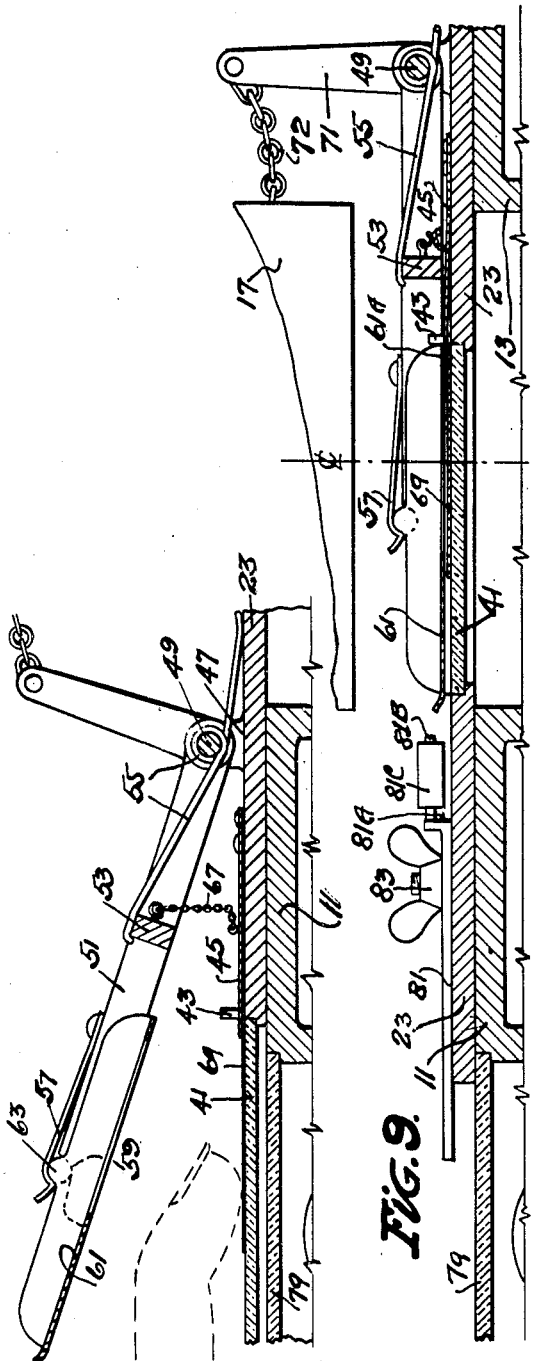

Patented Sept. 21, 1943

2,329,690

UNITED STATES PATENT OFFICE 2,329,690

NEGATIVE POSITIONER FOR ENLARGING PRINTERS

Richard Bolton, Memphis, Tenn.

Application October 19, 1940, Serial No. 361,836

17 Claims. (Cl. 88—24)

This invention relates to improvements in devices for holding and placing negative films for making enlarged prints thereof.

The advent of the small camera making small negatives, many of which are worthy of much larger prints, had brought about development of enlarging printers in which light is thrown directly through a negative film and by suitable enlarging lenses a much larger print is made. Ordinarily in this printing a lighting device is used which projects the light upward through the negative into the enlarging mechanism, at the top of which mechanism a rapid sensitized paper is used to make the print.

The light projector is supported below a suitable table and the enlarging printer or enlarger supported thereabove, a gap or throat being left between the lower end of the enlarger and the table, which gap allows the placing and positioning of the negative from which the print is to be made.

The actual printing with this type of apparatus is extremely rapid, but the necessarily accurate positioning of the film is difficult and slow and even after accurate placing has been done the masking and securing of the film without displacement is by no means easy, it resulting that this step consumes entirely too much time and printing is seriously slowed down.

In this art the problems to be met are largely increased by the varying sizes of negatives to be printed and the necessity that the negative, whatever its size, be accurately centered both as to width and length.

The objects of the present invention are primarily to speed up the placing of the negative for printing.

Further objects are to provide means facilitating accurate positioning of a single negative, and/or of the individual negatives of a strip of film.

To provide means for securing the negative while still manually held in placed position and for subsequently masking and holding the negative.

To provide means for positioning and holding a negative and for transferring such positioned negative into accurately positioned and centered printing position.

To provide means facilitating the accurate positioning of an individual negative of a connected strip and for guiding said strip of negatives to facilitate rapid positioning shift of successive or selected negatives of said strip and for rapid transference of such strip into accurate printing position after each such shift.

The means by which the foregoing and other objects are accomplished and the method of their accomplishment will readily be understood from the following specification upon reference to the accompanying drawings, in which:

Fig. 1 is a side elevation outlining essential parts of a well known type of rapid enlarging printer, with my device applied thereto.

Fig. 2 is an enlarged detail, taken as on the line II—II of Fig. 3, showing stop mechanism forming part of my device.

Fig. 3 is a plan view substantially double the scale of Fig. 1 with the enlarging mechanism thereabove removed.

Fig. 4 is a fragmentary sectional elevation taken as on the line IV—IV of Fig. 3 and on an enlarged scale.

Fig. 5 is a front elevation of the device as shown in Fig. 1.

Fig. 6 is a perspective view of a masking shield or mask for a small negative showing in dotted lines the relative positioning of openings in masks for larger negatives.

Fig. 7 is a longitudinal sectional elevation taken as on the line VII—VII of Fig. 3, showing the transfer slide in position for placing the negative and the negative being placed thereon.

Fig. 8 is a corresponding sectional elevation showing the slide partially retracted and initial clamping of the negative while it is still manually held in position; and Fig. 9 a third view showing the slide retracted to printing position.

Referring now to the drawings in which the various parts are indicated by numerals:

11 is a table having a substantially flat top. Depending and supported from this table is a projector 13 which includes a suitable light source. The table 11 is provided with a substantially rectangular opening 15 through which light from the projector shines upwardly through an enlarger 17, the detail of the constructions of the projector and enlarger not being germane to the present invention. The enlarger is supported above the table in suitable manner, as by a bracket 19, the bottom end 17—A of the enlarger being spaced from the top of the table to leave a throat or gap 21, the foregoing mechanisms being embodied in a well known type of enlarging printer now on the market.

The device of the present invention comprises a slide 23 which is disposed in the gap between the enlarger and the table and is reciprocable along the surface of the table top toward and away from the front edge 11—A of the table in suitable slideways 25, this reciprocation preferably being accomplished by a foot lever 27, supported by the table, motion being transferred as through thrust links 29 and 31, and a bell crank lever 33 and retraction being accomplished as by tension springs 35. The position of the slide when retracted is determined by stops, three of which, 37, 37—A and 37—B are indicated, these stops being pivotally supported as by a bracket carried pin 39, and being optionally shiftable, as indicated by the dotted position 37—X (Fig. 2) of the stop 37, to permit stopping use of such one of the stops as may be desired.

The slide 23 is provided with a rectangular opening which is covered by a clear glass plate 41, the opening and glass being as large as the largest negative which is to be printed. 43 is an elongated stop or guide bar which projects upward from the surface of the slide 23 and extends laterally thereof, this guide bar being positioned immediately adjacent the rear edge of the glass 41. 45 is a flat gripping spring which is secured to and held flat along the top of the slide rearward of the glass and guide box, as by rivets or screws, the front end of this spring extending slightly in front of the guide bar 43, into overlapping relation with the edge of the glass 31, the guide bar being suitably notched or interrupted to permit the spring to lie flat along the slide and its end to grip the edge of a negative placed on the glass and against the guide bar.

Extending upwardly from the slide, are ears 47, which ears journal a transverse shaft 49, to which is rigidly secured a yoke member having parallel side arms 51, these arms preferably being additionally braced apart as by a transverse bar or part 53, preferably integral therewith. The ears 47 are spaced rearwardly from the glass 41, and the arms 51 extend forwardly from the ears on opposite sides of the lateral edges of the glass.

55 is a spring, one end of which bears against the top of the slide 23 and the other against the transverse part 53 and urges the yoke arms 51 downward against the slide. At their outer ends the arms 51 carry latch springs 57, and are cut away to form a shoulder 59.

61 is a masking shield or mask, preferably of thin sheet metal, adapted to lie between the yoke arms 51 and having at its opposite ends outwardly extending pins 63 which are adapted to be engaged between the shouldered ends of the arms and the latch springs 57 and to be detachably retained thereby. These masks each have an opening 65 therethrough, there being masks with differing size openings for the different size negatives which are to be printed. The mask is shown in perspective in Fig. 6. That view shows a mask with a small size opening 65 therethrough, and dotted lines indicating larger size openings such as would be in other masks for larger size negatives. These openings are centered transversely of the mask, but longitudinally they all lie adjacent the back edge of the mask, the width of that portion 61—A of the mask which lies between the back edge of the opening and the back edge of the mask being in every case the same so that if superposed the back edges of all mask openings will lie along the same line. The masks are so positioned in the yoke arms that when these arms are swung downward by the spring 55 against the slide 23, the back edge portion 61—A of the mask is against the guide bar 43.

It will be noted that the projection of the gripping spring 45 beyond the guide 43 is somewhat less than the width of the strip 61—A so that the line formed by the mask on the print will not be indented or marred by the shadow of such spring.

Depending as from the transverse part 53 of the yoke is a flexible connector 67, which connector is secured to the spring 45, the length of the connector being so regulated that when the yoke arms 51 are fully raised, the spring 45 will be lifted sufficiently above the surface of the slide to permit easy insertion of a negative 69 under the end thereof projecting beyond the guide 43, but such that as lowering movement of the arms begins the spring will be allowed to close against the negative before substantial downward movement of the arms takes place.

The transverse shaft 49 extends laterally to one side of the ears 47 and this extension has rigidly secured thereto an arm 71, the extension being sufficient to bring this arm beyond the side of the enlarger 17 and beyond interference of the enlarger with the movement of the arm.

The arm 71 extends substantially at right angles upwardly from the yoke arms 51, and is connected at its upper end by a flexible connector 72 to an anchor 73, which anchor may be a pin extending from the side of the enlarger 17, this anchor being so positioned that when the slide 23 moves out from beneath the enlarger the connector 72 will arrest the movement of the arm 71 and raise the yoke arms 51 and the mask 61 carried thereby, and as the slide 23 approaches its final forward position will raise the spring 45 and release a negative thereunder.

In connection with the present table I also provide an enclosure 75 in which I position a light bulb 77 which serves as a viewing light as well as a position indicating light. The table top above this enclosure is cut away preferably to conform in size with the glass 41 carried by the slide 23, the opening being preferably covered by a ground glass 79. The light enclosure 75 and the ground glass 79 are so positioned relatively to the movement of the slide 23 that the clear glass 41 of the slide registers directly above the ground glass 79 when the slide is in forward position. The glass 79, as indicated in Fig. 3, is preferably marked with lines defining rectangles conforming in size with the various sizes of negatives which are to be enlarged and giving definite indication to assist in the proper positioning of such negative on the glass 41 thereabove.

To assist in placing and guiding strips of film, I may provide slotted guide members 81 which are adjustably mounted on the slide 23 and held as by wing nuts 83, these guide members having shoulder portions 81—A adapted to be moved into contact with the front edge of a strip of film disposed on the slide with its back edge against the guide bar 43. They have projecting portions 81—B adapted to overlie the surface of the film, these latter portions preferably being covered with sleeves 81—C of soft rubber to avoid scratching or marring of the film surface, the under surface of the portions 81—B, or if covered, of the sleeves 81—C, being spaced slightly in excess of the thickness of the ordinary film away from the top of the slide 23 so that the film may be readily inserted and shifted along thereunder.

If desired, the light 77 in the enclosure 75 may be controlled as by a switch 85 actuated by movement of the foot lever 27 as such lever completes its downward stroke in moving the slide 23 forward.

In operating the machine the operator places the proper size mask 61 in the yoke arms 51, and sets the corresponding stop as the stop 27 to limit return movement of the slide 23. He then takes his place in front of the edge 11—A of the table, ordinarily being seated on a stool of proper height. With his foot he depresses the lever 27 moving the slide 23 forward to the slide, directly over and in register with the ground glass 79 carried by the table and switching on the light 77. As the slide 23 approaches the end of its travel the connector 72 arrests the motion of the arm 71, raising the yoke arms 51, the mask 61 carried thereby and the spring 45.

The negative to be printed is laid on the glass 41 and against the guide 43 and is shifted and centered laterally by alinement with the side lines 79—A, B or C, as the case may be, marked on the underlying ground glass 79. Pressure of the foot on the foot lever 27 is eased up while the negative is still held by the fingers allowing the yoke arms and the mask carried thereby to lower slightly and the end portion of the spring 45 to grip the edge of the negative and hold it firmly in place. The fingers may now be removed from the film without danger of displacing it, the foot pressure is entirely relieved and the slide 23 is allowed to move back under action of the springs 35 until the back edge of the slide engages the stop, as the stop 27, previously set to limit the backward movement, this stop being coordinated to position the center of the negative exactly beneath the center fore and aft of the enlarger 17 and correspondingly over the center of the projector 13 therebelow, the lateral positioning having been accomplished in placing the negative on the slide.

Should a strip of films be placed on the slide and against the guide bar 43, the wing nuts 83 are loosened, the shoulders 81—A moved against the forward edge of the films with the sleeves 81—C overlying the film surface, and the film may then be shifted to position successive or related negatives into printing position as above described, but with greater facility since no attention need be devoted to fore and aft positioning.

It will be noted that the back edges of the negatives, irrespective of their size, are brought against a guide bar (43) having a fixed position on the slide 23, and that the fore and aft positioning of the negative under the enlarger is accomplished by stopping the return movement of the slide by the stops 37, stops of differing length being used for differing sizes of negatives.

It will be understood that this invention is concerned with the placing of the negative rather than the subsequent making of the print. In the machine partially depicted the sensitized paper is placed on the top of the enlarger (here cut away) and the exposure manually controlled. Under such conditions as many prints as are desired may be made without slide shift; or shift and negative change may be made after each print exposure.

It will further be understood that much of the detail herein shown is susceptible of variation and is typical only and that I do not wish or intend to limit myself to such detail except in those claims in which such detail is specifically set out.

I claim:

1. Negative positioning means for an enlarging printer having a table and printing mechanism supported above said table, said means including parallel, table carried slideways, spaced laterally on opposite sides of said mechanism, an opening in said table spaced from said mechanism along the axial center line of said ways, lighting means disposed below said opening, a negative carrier slidable mounted in said ways, said carrier having a raised negative-stop transversely disposed, and a transparent window having one edge abutting said stop; a mask holder hingedly secured at one end to said carrier, and adapted to detachably receive and carry any one of a plurality of negative masks, each said mask being adapted to cover said window and having therethrough a printed opening centered transversely of its said mask, the openings of said masks being of varying sizes and longitudinally each respectively being positioned with one edge adjacent and at a uniform distance from an edge of its said mask and means urging said holder and a said mask against said window; manually actuatable means for shifting said carrier to bring said window over said table opening, means for raising said holder and the mask carried thereby about said hinge means as said window approaches register with said opening, a member secured to said carrier and underlying said holder carried mask, said member having a portion extending past said negative stop into overlying relation with the adjacent edge of said window and biased into gripping relation therewith, and means linking said member to said holder adapted to raise said member as raising of said holder is being completed; means for accomplishing return shift of said carrier on release of said manual means, and for accomplishing release of said member and holder for successive gripping and mask closure action; table carried stop means limiting return shift to position said window beneath said printing mechanisms, and center the opening of a said mask with said mechanism, said stop means being manually shiftable to vary said limit in conformity with the mask used.

2. Negative positioning means for an enlarging printer having a table and printing mechanism supported above said table, said means including parallel, table carried slideways, spaced laterally on opposite sides of said mechanism, and an opening in said table spaced from said mechanism along the axial center line of said ways, lighting means disposed below said opening, a negative carried slidably mounted in said ways, said carrier having a raised negative-stop transversely disposed, and a transparent window having one edge abutting said stop; a mask holder hingedly secured at one end to said carrier, and adapted to detachably receive and carry any one of a plurality of negative masks, each said mask being adapted to cover said window and having therethrough a printing opening centered transversely of its said mask, the openings of said masks being of varying sizes and longitudinally each respectively being positioned with one edge adjacent and at a uniform distance from an edge of its said mask and means urging said holder and a said mask against said window; manually actuatable means for shifting said carrier to bring said window over said table opening, and actuate said lighting means, means for raising said holder and the mask carried thereby about said hinge means as said window approaches register with said opening, a member secured to said carrier and underlying said holder carried mask, said member having a portion extending past said negative stop into overlying relation with the adjacent edge of said window and biased into gripping relation therewith, and means linking said member to said holder adapted to raise said member as raising of said holder is being completed; means for accomplishing return shift of said carrier on release of said manual means, and for accomplishing release of said member and holder for successive gripping and mask closure action; table carried stop means limiting return shift to position said window beneath said printing mechanisms, and center the opening of a said mask with said mechanism, said stop means being manually shiftable to vary said limit in conformity with the mask used.

3. Negative positioning means for an enlarging printer having a table and printing mechanism supported above said table, said means including parallel, table carried slideways, spaced laterally on opposite sides of said mechanism, said table having an opening spaced from said mechanism along the axial center line of said ways, lighting means disposed below said opening, a negative carrier slidably mounted in said ways, said carrier having a raised negative-stop transversely disposed, and a transparent window having its rear edge abutting said stop; a mask holder hingedly secured at its rear end to said carrier, and adapted to detachably receive and carry any one of a plurality of negative masks, each said mask being adapted to cover said window and having therethrough a printing opening centered transversely of its said mask, the openings of said masks being of varying sizes and longitudinally each respectively being positioned with one edge adjacent and at a uniform distance from an edge of its said mask and means urging said holder and a said mask against said window; manually actuatable means for shifting said carrier to bring said window over said table opening, and actuate said lighting means, means for raising said holder and the mask carried thereby about said hinge means as said window approaches register with said opening, a thin flat member secured to said carrier having a portion extending past said negative stop into underlying relation with the rear edge of said holder carried mask, and overlying relation with the rear edge of said window and biased into gripping relation therewith, and means linking said member to said holder adapted to raise said member as raising of said holder approaches completion, means for accomplishing return shift of said carrier on release of said manual means, and for accomplishing release of said member and holder for successive gripping and mask closure action; table carried stop means limiting return shift to position said window beneath said printing mechanism, and center the opening of a said mask with said mechanism, said stop means being manually shiftable to vary said limit in conformity with the mask used.

4. Negative positioning means for an enlarging printer having a table and printing mechanism supported above said table, said means including parallel, table carried slideways, spaced laterally on opposite sides of said mechanism, said table having an opening spaced from said mechanism along the axial center line of said ways, lighting means disposed beneath said opening, a negative carrier slidably mounted in said ways, said carrier having a raised negative-stop transversely disposed, and a transparent window having its rear edge abutting said stop; a mask holder hingedly secured at its rear end to said carrier, and adapted to detachably receive and carry any one of a plurality of negative masks, each said mask being adapted to cover said window and having therethrough a printing opening centered transversely of its said mask, the openings of said masks being of varying sizes and longitudinally each respectively being positioned with one edge adjacent and at a uniform distance from an edge of its said mask and means urging said holder and a said mask against said window; manually actuatable means for shifting said carrier to bring said window over said opening, anchor means supported by said table, a flexible link secured at its opposite ends to said anchor and to a movable part of said holder for raising said holder and the mask carried thereby about said hinge means as said window approaches register with said table opening, a flat spring secured to said carrier, said spring having an end portion extending past said negative stop into overlying relation with the rear edge of said window and biased into gripping relation therewith, and means flexibly linking said member to said holder adapted to raise said member as raising of said holder approaches completion, a spring for accomplishing return shift of said carrier on release of said manual means, and for accomplishing release of said spring and said holder for successive gripping and mask closure action; table carried stop means limiting return shift to position said window beneath said printing mechanism and center the opening of a said mask with said mechanism, said stop means being manually shiftable to vary said limit in conformity with the mask used.

5. In an enlarging printer including a table and an enlarger above said table supported by and spaced from said table to leave a throat for placing negatives to be printed, means for placing and positioning negatives, including a viewing opening formed in said table forwardly from said enlarger and lighting means carried by said table below said opening, a negative carrier movably mounted on said table, said carrier having a transparent window adapted to underlie and support a said negative; a transversely disposed abutment secured to said carrier along one edge of said window, and adapted to aline an edge of said negative with said window edge, a flat spring secured to said carrier and extending past said abutment into gripping engagement with said window edge, a mask holder hingedly secured to said carrier, a mask having a printing opening therethrough detachably carried by said holder, a spring acting on said mask holder to urge said mask toward said window, means for shifting said carrier to bring said window over said table opening, anchor means supported from said table, a link connecting said anchor and said mask holder and adapted on approach of said window to said opening to raise said mask from window engagement, a second link connecting said holder and said flat spring, and adapted to raise said spring from gripping engagement, as window register with table opening is completed; means actuated by said shifting means for completing a circuit to said lighting means, means for returning said carrier to shift said window below said enlarger, and adjustable stop means mounted on said table and engaging said carrier to center said mask opening beneath said enlarger.

6. Apparatus in accordance with claim 5 in which said viewing opening is covered by a transparent panel carrying laterally positioned indicia.

7. In an enlarging printer including a table and an enlarging printer supported by and spaced above said table to leave a throat for placing negatives to be printed, means for placing and positioning negatives, including a viewing opening formed in said table forwardly from said enlarger and lighting means carried by said table below said opening, a negative carrier mounted for fore and aft movement along said table, said carrier having a transparent window adapted to underlie and support a negative; a transversely disposed abutment secured to said carrier along one edge of said window, adapted to aline an edge of said negative with said window edge, a negative-holding means secured to said carrier and extending into gripping engagement with said window edge, a mask holder hingedly secured to said carrier, a mask having a printing aperture carried by said holder, means acting on said holder to urge said mask toward said window, means for shifting said carrier to bring said window over said table opening, and actuate said lighting means, means adapted on approach of said window to said opening to raise said mask, means connecting said holder and said negative holding means, adapted to raise said holding means, as window register with table opening is completed; means for accomplishing return movement of said carrier, and stop means mounted on said table and engaging said carrier to position said negative in printing alinement beneath said printer.

8. A device in accordance with claim 7 in which said viewing opening is covered by a translucent panel carrying laterally disposed indicia to aid in negative positioning.

9. In an enlarging printer for use with negatives of varying size and including a table and an enlarger above said table supported by and spaced from said table to leave a throat for placing negatives to be printed, means for placing and positioning a selected size said negative, including a viewing opening formed in said table forwardly from said enlarger and lighting means carried by said table below said opening, a transparent panel, adapted to underlie and support said negative, movably mounted on said table; an abutment secured transversely along one edge of said panel and adapted to aline one edge of said negative with said panel edge, means for effecting gripping engagement with said panel edge, masking means having a printing opening therethrough selected to conform to said negative size, means urging said masking means toward engagement with said panel, manually operable means for shifting said panel over said viewing opening, means for raising said masking means from panel engagement, on approach of said panel to said viewing opening, means actuated by said masking means for raising said grip engagement means as panel register with viewing opening is completed; means for returning said panel below said enlarging printer, and stop means, adjustable in conformity with said negative size, mounted on said table for limiting return movement of said panel to effect positioning of said negative in desired centering alinement with said printer.

10. In an enlarging printer for use with negatives of varying size and which includes a table, and an enlarger thereabove, means for placing and positioning a selected size said negative, including a viewing opening formed in said table forwardly from said enlarger, lighting means carried by said table below said opening; a transparent panel, a member for determining fore and aft positioning of said negative on said panel, means for gripping the edge portion of a negative positioned against said member, a mask apertured to form a negative exposure opening selected to conform to said negative size, means urging said mask toward said panel to hold said negative flat thereon, manually operable means for shifting said panel over said viewing opening, coordinated means for successively raising said mask and said gripping means as said panel approaches said viewing opening, whereby to permit negative removal and replacement, and for restoring said gripping means and mask on return movement, resilient means adapted to return said panel beneath said enlarger, and stop means adjustable in conformity with said negative size limiting said panel return to accomplish fore and aft centering of said negative and said mask aperture beneath said printer.

11. A device in accordance with claim 10 in which said viewing opening is provided with a translucent cover having laterally disposed indicia to assist in transverse centering of a negative on said panel.

12. Negative positioning means for a photographic printer having a table and printing mechanism, said means including longitudinal guide means, said table having an opening spaced longitudinally from said mechanism, lighting means disposed below said opening, a negative carrier movably mounted in said guide means, said carrier having a transverse negative-stop, and a transparent window having one edge abutting said stop; a mask holder hingedly secured to said carrier, and adapted to detachably receive and carry any one of a plurality of masks, each adapted to cover said window and each having therethrough a printing opening, the openings of said masks being of varying sizes, and longitudinally all being positioned adjacent one edge of their respective said masks and at a uniform distance from said edge, and means urging said holder and a mask carried thereby against said window; means for shifting said carrier to bring said window over said table opening, means for raising said holder and said mask carried thereby about said hinge as said window approaches register with said opening, a member secured to said carrier having a portion extending past said negative stop into overlying relation with the adjacent edge of said window and biased into gripping relation therewith, and means linking said member to said holder adapted to raise said member on raising of said holder; means for accomplishing return of said carrier on release of said shifting means, and for accomplishing release of said member and holder for successive gripping and mask closure action; and table carried stop means limiting carrier-return, to position said window beneath said printing mechanism, and center the opening of said mask with said mechanism, said stop means being shiftable to vary said limit in conformity with the mask used.

13. A photographic printing apparatus, for use with negatives of varying sizes including a viewing station and an exposure station in off-set relation; a negative carrier having an exposure opening therethrough; means for longitudinally moving said carrier to said exposure station; means on said carrier lying adjacent a transverse edge of said opening, for determining position of a said negative on said carrier, with a negative edge adjacent said transverse opening edge; and a plurality of stop means for limiting movement of said carrier toward said exposure station, said stop means individually, being selectively shiftable to accomplish positioning of said opening edge relative to said exposure station.

14. A device in accordance with claim 13, in which said viewing station is provided with laterally disposed indicia to assist in transverse centering of a negative on said carrier.

15. A device in accordance with claim 13, in which said carrier includes a member biased to grip an edge of a negative positioned on said carrier, and means to respectively release and restore said grip, as said carrier approaches and recedes from said viewing station.

16. A device in accordance with claim 13, in which said carrier includes a member biased to grip an edge of a negative positioned on said carrier, and a mask apertured to overlie said negative, and biased to seat thereon, means to respectively raise said mask and said member successively, as said carrier approaches and to lower said member and said mask successively as said carrier recedes from, said viewing station.

17. A photographic printing apparatus for negatives of varying size, comprising a viewing station and an exposure station in off-set relation, a negative carrier, means for moving said carrier from said exposure station to said viewing station and returning same to said exposure station, abutment means on said carrier for determining positioning of a said negative along the line of movement of said carrier, and means adjustable in conformity to negative size for limiting return movement of said carrier to effect fore and aft centering of said negative relative to said exposure station, said carrier including a member biased to grip an edge of a negative positioned on said carrier, a mask apertured to overlie said negative and biased to seat thereon, and means to respectively raise said mask and said member successively as said carrier approaches and to lower said member and said mask successively as said carrier recedes from said viewing station.

RICHARD BOLTON.